United States Patent [19]
Kihara et al.

[11] Patent Number: 5,268,764
[45] Date of Patent: Dec. 7, 1993

[54] SIGNAL OUTPUT CIRCUIT FOR IMAGE SENSOR

[75] Inventors: Osamu Kihara; Kensuke Sawase, both of Kyoto, Japan

[73] Assignee: Rohm Co., Ltd., Kyoto, Japan

[21] Appl. No.: 850,898

[22] Filed: Mar. 13, 1992

[30] Foreign Application Priority Data

Mar. 15, 1991 [JP] Japan .................. 3-50971

[51] Int. Cl.$^5$ .................................. H04N 3/15
[52] U.S. Cl. ................................... 358/213.16
[58] Field of Search ............... 358/213.16, 213.15, 358/163; 382/65, 67, 68, 50, 53

[56] References Cited

U.S. PATENT DOCUMENTS 4,700,231 10/1987 Matsumoto ............... 358/213.16
4,839,729 6/1989 Ando et al. .............. 358/213.16
5,132,801 7/1992 Yamano .................. 358/213.16

Primary Examiner—Leo H. Boudreau
Attorney, Agent, or Firm—Fish & Richardson

[57] ABSTRACT

A signal output circuit is used for an IC-patterned image sensor, including, at its signal processing part, source-follower amplifiers for converting a high impedance image signal to a low impedance image signal. To eliminate offset voltages of the amplifiers, an amplifier for converting the impedance of the image signal is disposed in parallel to an amplifier for converting an impedance of a reference voltage. A differential amplifier is used to calculate a difference between the foregoing two amplifiers. The signal output circuit includes a trimming circuit to adjust an offset voltage of these amplifiers.

4 Claims, 4 Drawing Sheets

SIGNAL OUTPUT CIRCUIT FOR IMAGE SENSOR

BACKGROUND OF THE INVENTION

1. Field of the Invention:

This invention relates to a signal output circuit for an image sensor, and more particularly to an improved signal output circuit for null-adjusting an offset voltage of an operational amplifier incorporated into an integrated circuit together with light receiving elements.

2. Description of the Related Art:

Usually a multiple-tip type image sensor for reading images comprises a plurality of chips on which light receiving elements are juxtaposed. With such an image sensor, the chips tend to show non-uniform electrical characteristics, e.g. offset voltages for an operational amplifier, thereby causing errors in sensor outputs. To compensate for such errors, dark output characteristics of the chips are measured before they are assembled. Then the chips are grouped according to their output characteristics, so that the chips having the same characteristics are selected and die-bonded on a substrate to form an image sensor. The bonded chips are then null-adjusted according to their dark output characteristics by external offset circuits.

A thin film-type image sensor also suffers from non-uniform characteristics in film substrates, so that an assembled image sensor has its offset voltage adjusted by an external circuit.

With foregoing image sensors, the offset voltage of the operational amplifier of the signal circuit should be adjusted by an external circuit. This leads to an increase in the number of components, assembling operations and manufacturing cost.

SUMMARY OF THE INVENTION

It is therefore an object of this invention to provide a signal output circuit for an image sensor which can be manufactured with less components, with fewer assembly operations works and at a reduced cost.

According to the invention, there is provided a signal output circuit for reading and outputting pixel data stored in an image sensor composed of a plurality of juxtaposed light receiving elements, the signal output circuit comprising: a read timing generating circuit for generating successive read timing signals; switching elements connected to the light receiving elements so as to output signals for the light receiving elements in response to the read timing signal, the switching elements being successively turned on in response to the read timing signal; reset switching elements for simultaneously resetting outputs of the light receiving elements, the reset switching elements being connected to the switching elements; and an output circuit for successively outputting the signals from the light receiving elements, the output circuit including a first amplifier for receiving a reference voltage, a second amplifier for receiving the signals outputted from the light receiving elements, a differential amplifier for differentiating the outputs of the first and second amplifiers, and an adjusting circuit for supplying a null adjusted value to the second amplifier.

DETAILED DESCRIPTION OF THE PREFERRED EMBODIMENT

Figure 1:
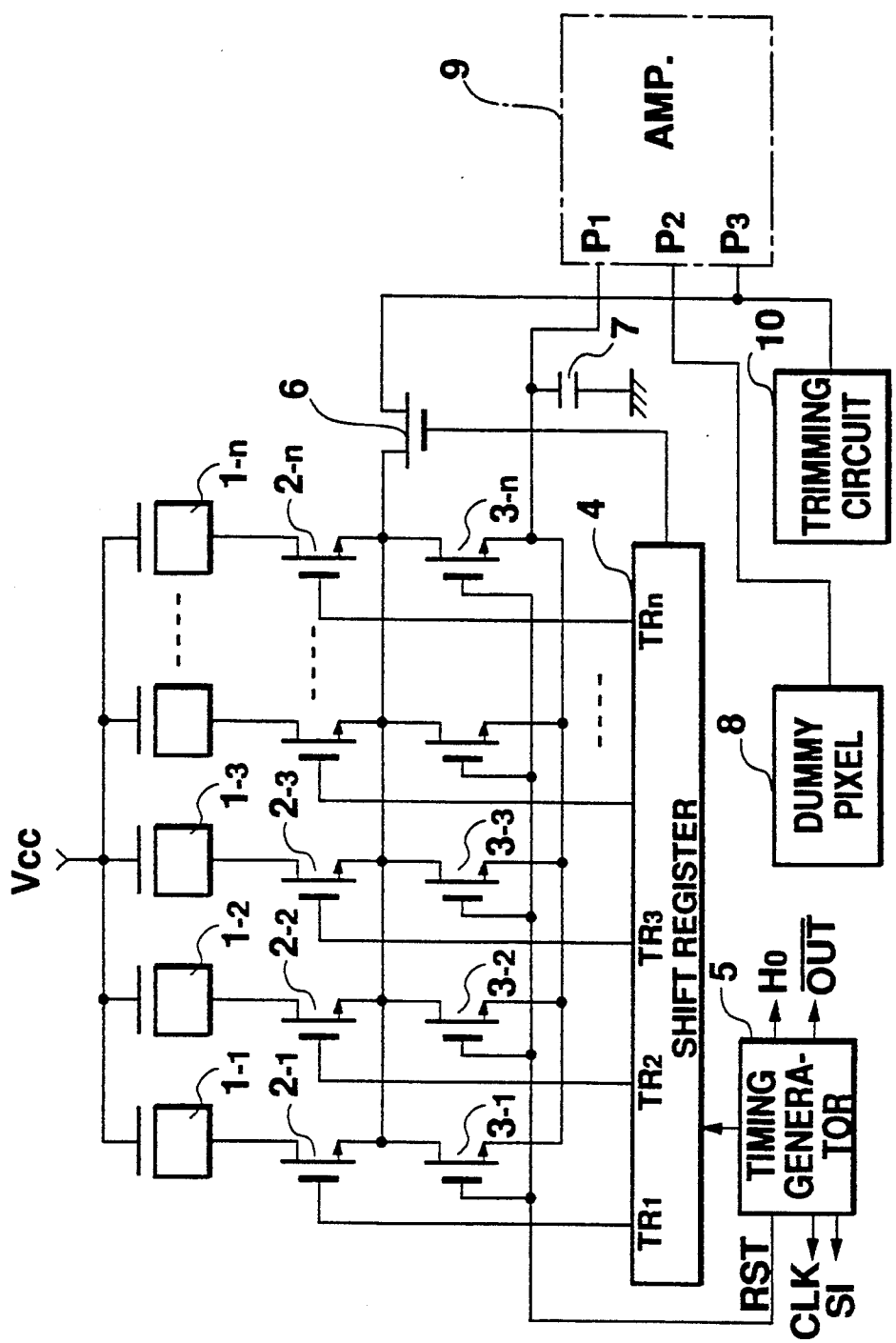
FIG. 1 is a block diagram showing an image sensor and a signal output circuit according to one embodiment of the invention.

As shown in FIG. 1, a signal output circuit and an image sensor are made of an integrated circuit. Light receiving elements $1_{-1}, 1_{-2}, \ldots 1_{-n}$ receive electric charges when switching MOS transistors $2_{-1}, 2_{-2}, \ldots, 2_{-n}$ are sequentially turned on by timing signals $TR_1, TR_2, \ldots TR_n$ from a shift register 4. These electric charges are then outputted to an amplifier circuit 9 via an output transistor 6.

All of the resetting MOS transistors $3_{-1}, 3_{-2}, \ldots 3_{-n}$ are simultaneously turned on in response to an RST signal from a timing signal generating circuit 5 so as to reset the outputs of the light receiving elements.

The image sensor circuit includes a dummy pixel 8, and a trimming circuit 10 for adjusting an offset voltage. The trimming circuit 10 is a feature of this invention, serving as an adjusting circuit. These circuit are shown in detail in FIGS. 2 and 3.

Figure 2:
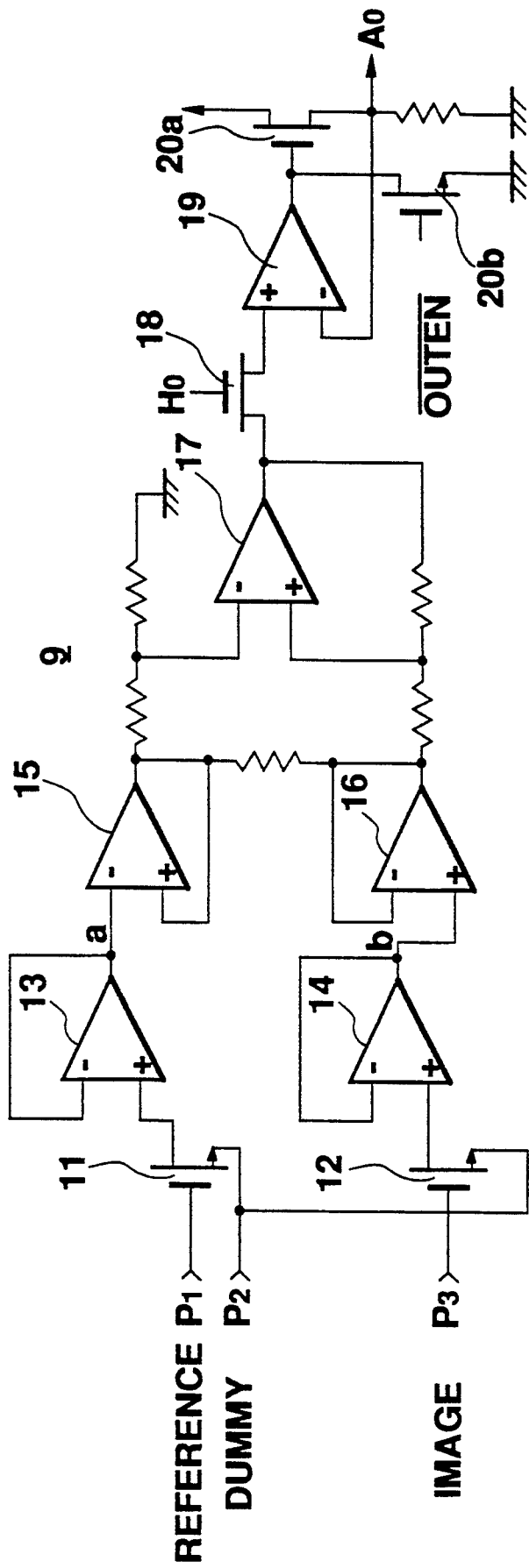
FIG. 2 shows a part of the signal output circuit in detail.

As shown in FIG. 2, amplifiers 13, 14 of an amplifier circuit 9 are source-follower amplifiers for converting a high impedance image signal into a low impedance image signal. Offset voltages which would cause erroneous signals are generated in these amplifiers 13, 14. A dummy signal $P_2$ is read from the dummy pixel 9 (in FIG. 1), being applied to the drains of MOS transistors 11, 12. A reference signal $P_1$ is applied to the gate of a MOS transistor 11 from drains of the MOS transistors $3_{-1}, \ldots 3_{-n}$. A trimming signal from the trimming circuit 10 as well as the image sensor output is inputted to the gate of a MOS transistor 12 as an image signal $P_3$.

Source of the MOS transistor 11 is connected to the non-inverting (+) input terminal of the amplifier 13, while the source of the MOS transistor 12 is connected to the non-inverting (+) input terminal of the amplifier 14.

Outputs a, b of the amplifiers 13, 14 are amplified by amplifiers 15, 16, have the offset voltages removed by a differential amplifier 17, are applied to an output amplifier 19 via a MOS transistor 18, and are outputted via a MOS transistor 20a.

In this embodiment, the drains of field-effect transistors FET11, FET12 receive, from the dummy pixel, a signal corresponding to a dark level of an image.

In the amplifier circuit 9, the amplifier 13 amplifies an output from the field-effect transistor FET11 which receives the reference signal P1 as an input signal. The amplifier 14 amplifies an output from the field-effect transistor FET12 which receives the image signal P3 read by the light receiving element 1 as an input signal. The outputs a, b pass through amplifiers 15, 16, and then their differences are calculated by a differential amplifier 17. When they are equal, the offset components at the amplifiers 13, 14, especially, can be considered to have been removed by the differential amplifier 17. Therefore, the output can be protected against superimposition of error signals caused by the offset voltages.

Even when they are patterned on the IC as one chip, the amplifiers 13, 14 do not however always have exactly the same electrical characteristics, inevitably causing different offset voltages. The difference between the offset voltages of the amplifiers 13, 14 is differentially amplified by the differential amplifier 17, being outputted as an error signal which cannot be disregarded. Therefore, the variable offset voltages should be adjusted by an external circuit as described above.

Figure 3:
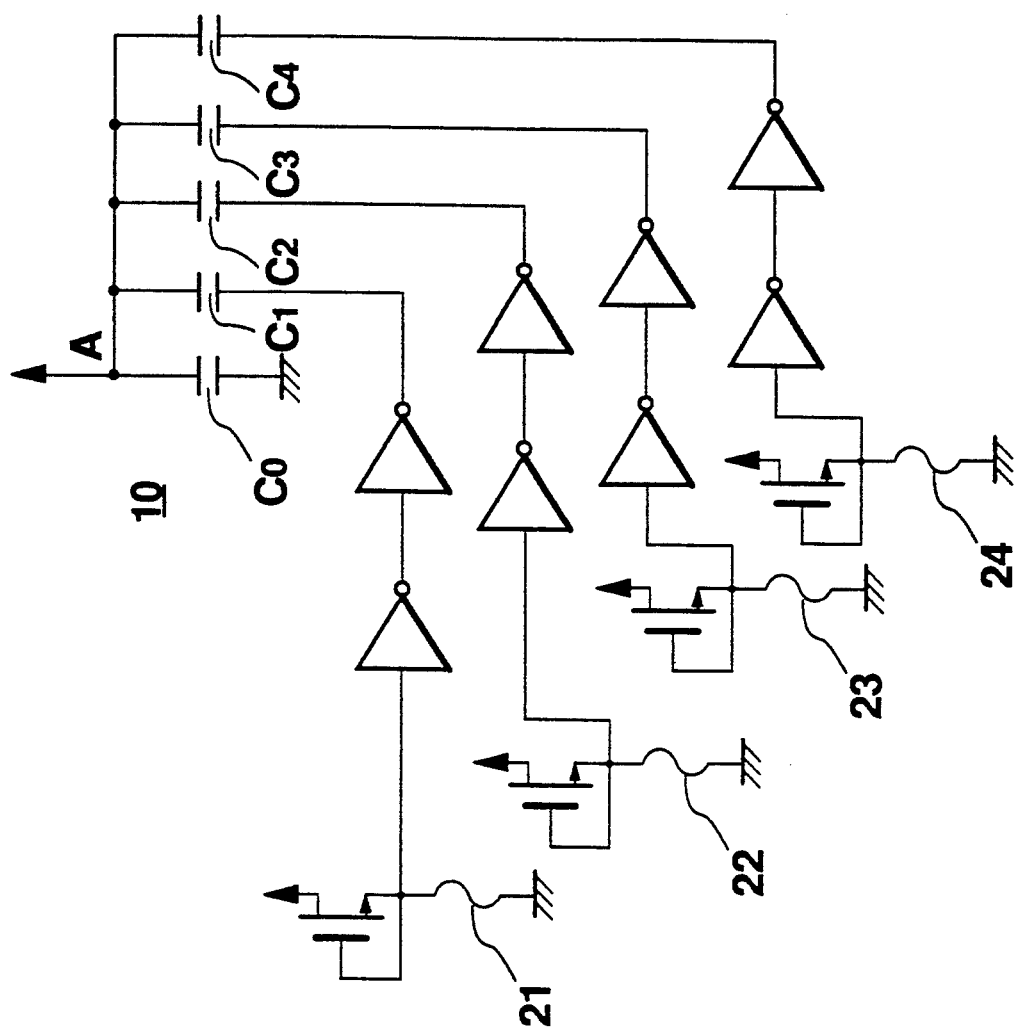
FIG. 3 is a circuit diagram showing a trimming circuit.
Figure 4:
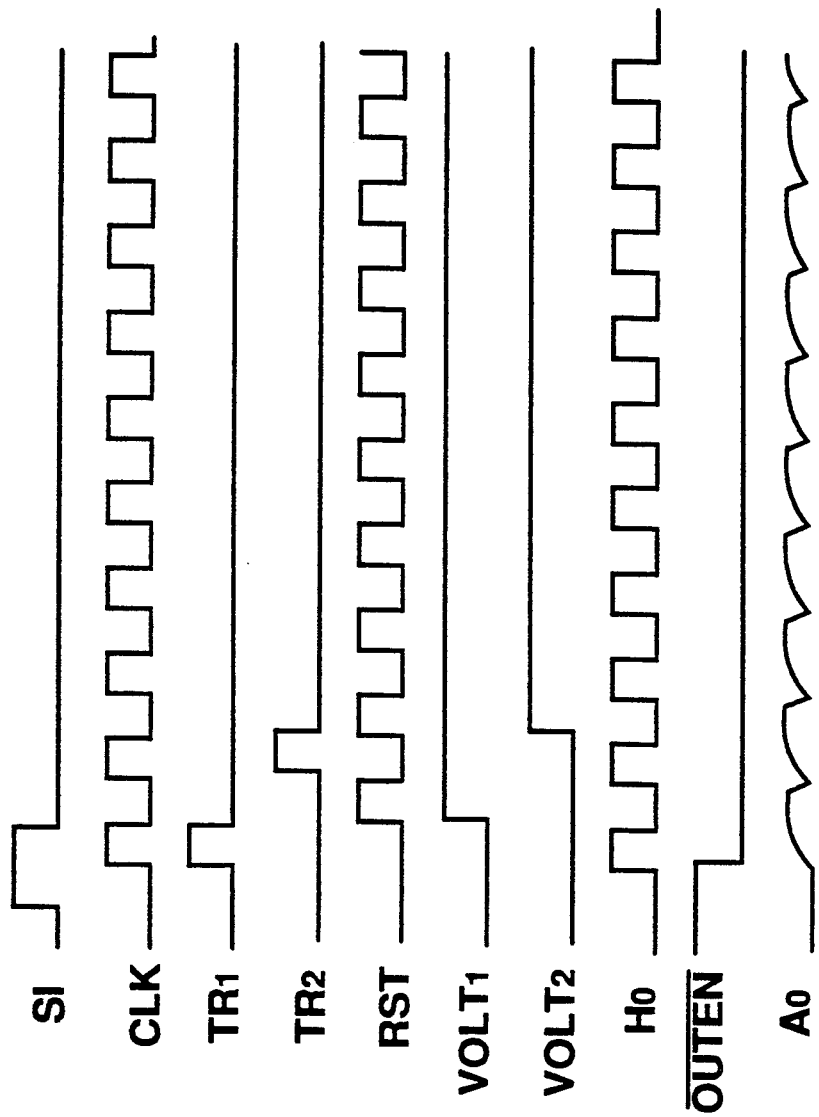
FIG. 4 is a timing chart showing the signal outputting operation of the image sensor.

The trimming circuit 10 is used to adjust the offset voltages. As shown in FIG. 3, a signal voltage at the point A is applied as the signal $P_3$ (shown in FIG. 2) to the gate of the MOS transistor 12. The signal voltage at the point A depends upon a capacitance $C_0$. The capacitance $C_0$ will become $C_1$, $C_2$, $C_3$, or $C_4$ according to the blowing of one or more of the trimming fuses 21, 22, 23, 24, so that the offset voltages can be easily adjusted.

In this embodiment, the image sensor 1 and associated signal output circuits are made of one IC pattern. The trimming circuit 10 is also included in the same IC pattern.

When the signal from the image sensor 1 to the field-effect transistor FET 12 coincides with the reference signal to the field-effect transistor FET 11, the signal from the trimming circuit 10 is adjusted so that the amplifier circuit 9 emits no output. Thus, an initial offset voltage adjustment is completed for the IC chips. Specifically, the output of the amplifier circuit 9 is adjusted to zero by serially blowing the foregoing trimming fuses 21, 22, 23, 24 according to a desired combination. Once the offset adjustment is completed, the IC chips can be properly adjusted.

After the offset adjustment, the signal output circuit operates as described hereinafter. When triggered by a signal SI, the light receiving elements $1_{-1}, 1_{-2}, \ldots, 1_{-n}$ serially store electric charges according to the brightness of pixels in timed relationship with a clock signal CLK. Switches open and close in response to signals TRi and CLK, causing the light receiving elements $1_{-1}, 1_{-2}, \ldots 1_{-n}$ to discharge the electric charges. In synchronization with the rise of the clock signal CLK, signals VOLT1, VOLT2, ... are outputted. These signals have a high impedance, being converted to a low impedance signal by the source-follower amplifiers 13, 14.

With the arrival of the RST signal, the MOS transistors $3_{-1}, 3_{-2}, 3_{-n}$ are turned on. The electric charges of the respective pixels are adjusted to the reference level via a capacitor 7. The low impedance electric charges are amplified by inverting amplifiers 15, 16 to become an $A_0$ signal. Stable time of the output $A_0$ can be secured in timed relation with the fall of the $H_0$ signal. According to the invention, variation of the dark output characteristics of the image sensor can be stabilized. The offset adjusting circuit is included in the image sensor circuit, so that no external circuit will be necessary for the offset voltage adjustment, thereby reducing the manufacturing processes and cost.

What is claimed is:

1. A signal output circuit for reading and outputting pixel data stored in an image sensor composed of a plurality of juxtaposed light receiving elements, said signal output circuit comprising:
   (a) a read timing generating circuit for generating successive read timing signals;
   (b) switching elements connected to the light receiving elements so as to output signals for the light receiving elements in response to the read timing signal, said switching elements being successively turned on in response to the read timing signal;
   (c) reset switching elements for simultaneously resetting outputs of the light receiving elements, said reset switching elements being connected to said switching elements; and
   (d) an output circuit for successively outputting the signals from the said light receiving elements, said output circuit including a first amplifier for receiving a reference voltage, a second amplifier for receiving the signals outputted from said light receiving elements, a differential amplifier for differentiating the outputs of said first and second amplifiers, and an adjusting circuit for supplying a null-adjusted value to said second amplifier.

2. A signal output circuit according to claim 1, wherein said light receiving elements, read timing signal generating circuit, read switching elements, reset switching elements and output circuit are made of an integrated circuit.

3. A signal output circuit according to claim 1, wherein said adjusting circuit includes a trimming circuit whose output voltage is adjusted by a plurality of trimming fuses.

4. A signal output circuit according to claim 1, wherein inputs of said first and second amplifiers are respectively connected to MOS transistors, a dummy signal corresponding to dark level of the image is applied to a common drain terminal of said MOS transistors, the reference voltage is applied to gate of one of said MOS transistors, and an image input is applied to gate of the other of said MOS transistor.

* * * * *